July 11, 1950 A. C. BRANDT 2,514,929
LINE GUIDE FOR FISHING RODS
Filed Jan. 19, 1948
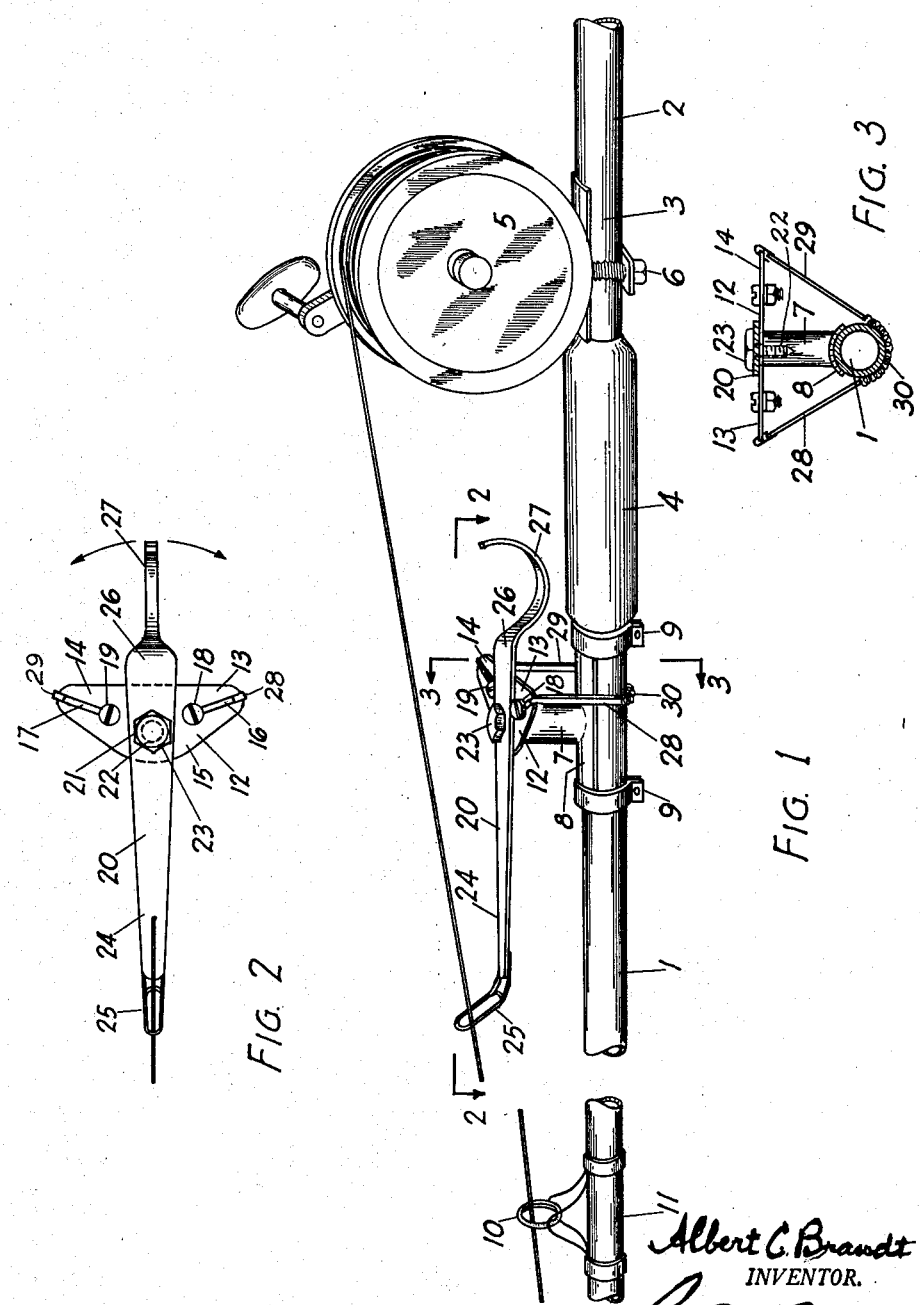
Albert C. Brandt
INVENTOR.
BY Percy Tate Griffith
ATTORNEY Patented July 11, 1950

2,514,929

UNITED STATES PATENT OFFICE 2,514,929

LINE GUIDE FOR FISHING RODS

Albert C. Brandt, Sarasota, Fla.

Application January 19, 1948, Serial No. 3,105

3 Claims. (Cl. 43—24)

This invention relates to line guides for fishing rods designed to direct the winding up of the line upon the reel in even and level manner. The object of the invention is to provide a line guide operable under hand direction of the angler, adapted to be set upon the rod between the reel-seat and the rod-eyelet first beyond, help prevent slipping of hand or rod, cause line to wind accurately, evenly, permit angler to handle line directly when desired, which will be adjustable in swing of the line-guide to either side, compensate any imperfect seating or balance of reel; prevent entanglements of line with rod, reel or guide; be easily applicable, avoid backlash, constitute supplemental support by left hand in holding; sturdy, simple, readily manufactured and assembled.

The invention consists in a line-guide made to be fitted upon a rod above the reel, and clamped thereto, comprising a pedestal on which is set a freely-swinging lever laterally moving under the governance of the angler, beneath the level of the line, (running through an eyelet of the line-guide), within a limited range of movement of the lever fixed by independently adjustable stops set in a double-winged plate fixed upon the pedestal, mostly back of the pivot of the lever, a thumb-piece at the rear end of the lever, a material distance above the reel-seat, and further consists in the novel construction and arrangement of parts hereinafter fully described and shown.

Minor changes may be made, without departing from the essence of the invention as set forth in the appended claims.

In the accompanying drawings forming part of this specification, in which like numerals of reference designate like parts in the several views:

Figure 1 is a partially perspective side elevation of a fishing rod equipped with my line-guide, this rod being partly broken to reduce length in the figure;

Figure 2 is a plan view of a detail of the line-guide, removed from the rod, being a view taken substantially as if drawn as a section on the line 2—2 of Figure 1;

Figure 3 is a vertical cross section taken on the line 3—3 of Figure 1.

My line-guide is constructed usually in such size and form as will be applicable to most customary sizes and styles of rods. In Figure 1 I show such a rod, 1, with butt end 2, usually held by the right hand to cast, wind reel, being steadied by left hand as required. It is furnished with a reelseat 3, above the butt end, and with a second grip or handle portion 4 above the reelseat 3, usually held by the left hand when the right is winding. Upon the reelseat 3 the reel 5 is attached in any desired manner, usually detachably, by clamping devices 6.

Above this second grip portion 4 my line guide is similarly detachably affixed fairly far up the rod, to leave between the said guide and the reel 5 a material and major part of the left rod-grip for purposes which will appear later. The structure of the line-guide embodies a pedestal 7, preferably though not necessarily cylindrical in form, provided with a base 8, fitting the rounded contour of the rod, and lying longitudinally thereon, which base is provided with any desired form of attaching devices 9, by means whereof it is held tightly in place upon said rod approximately in exact line with the lateral center of the reel 5, and somewhat midway between said reel and the first eyelet 10 of the rod.

Upon the upper end of the pedestal 7 is fixed a triangular plate 12, which may be integral therewith, which is formed with two lateral wings 13, 14, at respectively left and right sides of the said plate 12, and the rod 1. The apex 15 of the triangle faces forwardly or up the rod, and said plate is set or formed upon the pedestal 7 with its apex point projecting but moderately beyond said pedestal, and its major portion or wings 13, 14 projecting materially rearwardly thereof, to provide a firm solid portion back of said pedestal for a purpose which will hereinafter appear. In each of the wings 13, 14 is formed a laterally-extending diagonal slot 16, 17, in which are respectively mounted set screws 18, 19. The width of the plate 12, its wings and slots, is usually in proportion to the rod-thickness and the rest of the parts, including width of reel, shown in the drawing, and to the amount of play in the line-guide, as hereinafter explained, and may be varied to suit the manufacturer or user; this factor having governance of adjustment or delimitation of the throw of the line-guide in winding.

Upon this plate is pivoted a flat narrow lever 20, provided centrally with an aperture 21, aligned with a vertical screw-hole 22 in the pedestal 7 through which a polyhedral headed screw 23 extends through both holes; neither of which is visible in drawing, location indicated by numerals in Figure 2. As desired, the screw 23 is adjusted initially and in use, to frictionally control the ease of movement of lever 20. The front end 24 of said lever carries an eyelet 25 through which the fishing-line is passed in stringing the rod from reel; the rear end 26 of said lever 20 extends a convenient distance back of said pedestal 7 and plate 12, and is provided with a U-shaped or hooked thumb-piece 27.

At either side of the device are line-guards 28, 29, of any desired shape and material, preferably of flat wire, turned at the upper end to hook into the corners of the slots 16, 17, and connected at their lower ends with an elongated helical spring 30, which lies under the rod 1, and by its spring tension tightens the guard-wires and itself and clamps them upon the rod; the tighter they hold there, the more efficiently they keep the line 2 from entangling with the line-guide in any way. The eyelet 25 of the lever 20 is slightly inclined upwardly forwardly, and the thumb-piece 27 lies below the level of the fishing-line as it leaves the reel 5, in a position where the thumb-piece will take the grip of the left thumb handily while the rest of the same hand clasps the rod beneath.

The operation of the invention is as follows: The line-guide having been attached to the rod just above the upper handle portion 4 and the line being in position on the rod as usual, and threaded through eyelet 25 of guide lever 20, the attaching devices 9 are tightened to clamp the pedestal-base 8 upon said rod, and the line-guards 28, 29 are placed in position with the helical spring 30 clinging to the underside of the rod next the upper handle portion 4. The rod is grasped in usual manner to which the angler is accustomed, usually with left hand gripping upper handle 4 while right hand winds reel. The left hand will have the thumb upon the thumb-piece 27, said thumb bearing down on the thumbpiece, fingers beneath, on grip 4, making a firm supplemental left hand grip of said thumbpiece and lever 20, combined with the grip 4. At the same time the thumb governs the said lever, holds it tightly or loosely and as right hand winds reel, said left thumb moves the lever 20 from side to side. The angler watches the line being reeled in upon the reel, and sees that it comes along smoothly, evenly. In the main, any regular movement of the lever back and forth will wholly automatically wind the line up uniformly.

The set screw stops 18, 19, operating in the slots 16, 17, limit the motion both right and left, so if the stops have been adjusted to match the width of the reel, and the angler works the lever to the right and the left till it strikes the stops 18, 19, the line will automatically wind smoothly. In setting the line-guide if it is tried on a few turns of the reel, the set screws can be adjusted to suit. In case the reel seat is not too exact, or the seating of the reel not perfectly fitted, one has only to adjust one single screw to favor one side as desired, and an even level surface given to the line, without lumping or bunching.

There is no backlash, there is little chance of contact of line with reel, or its cutting thereby, the angler is freed of many of the troubles which line-guides are supposed to eliminate, but do not always do so. From Figure 1, it is seen that the thumb-piece is situated so that it does not interfere with the freedom of the reel, the space between reel and lever 20 is left free for all grip purposes. If by any chance snarl in the line occurs, or if in fishing or winding line the angler wishes to take direct manual charge of the line, he can easily.

The wings of the plate being wide enough to ward off any dropped line falling where entanglement may follow, the line-guards are held well away from the device, shield it from the line getting under the plate, enable frictional pressure of thumb-piece on said plate at any point, prevent the thumb-piece from being pushed down on the rod, or upper grip thereof. If by use, the lever 20 gets too loose, it is only necessary to tighten the screw 23. The clamped-on pedestal 7 and its appurtenances combine with the upper hand grip 4, to serve as an additional means for gripping the rod by the left hand above its reel, in fighting a heavy game-fish while reeling in with the right hand, and guiding the lever 20 with the left.

What I claim as new and of my invention is:

1. A line guide for fishing rods, comprising a pedestal adapted and constructed to be secured to a fishing rod above the reel and upper reel seat grip, longitudinally centrally on the rod and provided with clamps thereon for holding said pedestal against said seat grip, a swinging lever free to move laterally except as governed and limited by the hand of the angler and by its mechanism under his manipulation, the said lever being pivotally connected intermediate its ends to the said pedestal, the means by which it is pivotally connected comprising, an adjusting screw securing the said lever thereto to permit tightening of such lever against such lateral swing, a thumb-piece at the lower end of said lever at a suitable leverage distance from said pivot and also at such distance from the reel and grip seat as to leave room for the angler both to grasp the rod at said seat, and also operate the line guide by the same hand at the same place, a plate fixed on said pedestal, through which said pivot extends, projecting rearwards under said lower end of said lever and thumb piece, wings on either side of said plate provided with lateral slots, separately adjustable stops in said slots providing limits of lateral swing to said lever to automatically wind the line evenly when the lever thumb piece is swinging the same laterally under the guidance of the angler, and accommodate the guide to different sizes of reels; and an eyelet upon the upper end of the guide; all whereby the angler's hand may grasp the rod, guide the line evenly, by a strong grip of the hand between reel and guide beneath and abutting against the latter.

2. A line guide for fishing rods, comprising a pedestal and a pedestal base, adapted and constructed to be secured to a fishing rod above the reel and upper reel seat grip, and provided with clamps thereon to attach it thereto; a plate fixed upon the pedestal top and provided with wings at either side, a movable lever pivoted upon said plate, having a long forward end extending beyond and above the pedestal and plate, provided with a line eyelet, and provided at its rear end portion with a U-shaped thumb-piece, the said plate and wings projecting rearwardly of the pedestal, and the rear end of the lever projecting rearwardly of said plate and wings; said lever being adjustably swingable on the pedestal; independently adjustable stops at either side of the winged plate governing lateral motion of said lever; and line guard devices at either side of the winged plate, secured thereto and a helical spring extending under the rod and joining said line guard device.

3. A line guide for fishing rods comprising a supporting device and a line guide lever pivoted thereon, adapted and constructed to be secured to a fishing rod above the reel and the upper reel seat grip, the said supporting device comprising a pedestal of a height enough to keep the line guide lever a distance above the rod, said lever having a line guide eyelet inclined upwardly forwardly therefrom, a pedestal-base shaped to fit the surface of the rod, attaching means fastening said pedestal-base in place on said rod, a plate fixed on the pedestal top, the lever being pivoted on said plate and a screw forming said pivot and being axially adjustable, said plate having wings on either side forming part thereof, provided with lateral slots, said plate and its wings projecting rearwards of the pedestal, said lever being provided with a thumb-piece at its rear end; laterally and independently adjustable stops located in the slots of said winged plate; and a pair of line guards detachably mounted in the slots of said plate and extending downwardly therefrom, and a fastening device extending under the rod and joining said line guards.

ALBERT C. BRANDT.

REFERENCES CITED

The following references are of record in the file of this patent:

UNITED STATES PATENTS

| Number | Name | Date |
|---|---|---|
| 698,029 | Krueger et al. | Apr. 22, 1902 |
| 835,557 | Ross | Nov. 13, 1906 |
| 932,837 | Unger | Aug. 31, 1909 |
| 1,419,431 | Williams | June 13, 1922 |
| 1,580,524 | Nelson | Apr. 13, 1926 |
| 1,635,629 | Marcy | July 12, 1927 |